United States Patent [19]

Myers et al.

[11] 4,101,298
[45] Jul. 18, 1978

[54] PRESSURE CYCLING CONTROL FOR FLUID SEPARATOR MECHANISM

[75] Inventors: William Perry Myers; Terence August Torzala, both of Davenport, Iowa

[73] Assignee: The Bendix Corporation, Southfield, Mich.

[21] Appl. No.: 784,901

[22] Filed: Apr. 5, 1977

[51] Int. Cl.[2] .............................................. B01D 53/00
[52] U.S. Cl. ....................................... 55/163; 55/179; 55/389
[58] Field of Search ........................ 55/21, 33, 75, 163, 55/179, 387, 389; 137/599

[56] References Cited

U.S. PATENT DOCUMENTS

| 3,080,693 | 3/1963 | Glass et al. | 55/163 |
| 3,318,329 | 5/1967 | Norwood | 137/599 |
| 3,324,631 | 6/1967 | Kreuter | 55/163 |
| 3,898,047 | 8/1975 | Cramer | 55/33 X |
| 3,902,875 | 9/1975 | Bridigum et al. | 55/179 X |

Primary Examiner—Charles N. Hart
Assistant Examiner—Robert H. Spitzer
Attorney, Agent, or Firm—Leo H. McCormick, Jr.; Ken C. Decker

[57] ABSTRACT

A control system for sequentially connecting a pressurized fluid mixture to first and second beds of adsorption material to separate a component from the fluid mixture and produce a product effluent. A first valve mechanism allows the fluid mixture to flow to the first bed and a portion of the product effluent to purge the component from the second bed in a first portion of a mode of operation. A second valve mechanism allows the fluid mixture to flow to the second bed and a portion of the product effluent to purge the component from the first bed in a second portion of the mode of operation. A first sensor develops a first signal corresponding to the fluid pressure of the product effluent in the first bed and a second sensor develops a second signal corresponding to the fluid pressure of the product effluent in the second bed. A pneumatic logic sequencer connected to the first and second sensors responds to the first and second signals to sequentially operate the first and second valves and establish a cycle of operation.

14 Claims, 4 Drawing Figures

PRESSURE CYCLING CONTROL FOR FLUID SEPARATOR MECHANISM

BACKGROUND OF THE INVENTION

Oxygen separators such as disclosed in U.S. Pat. No. 3,880,616, separate fluid mixtures into first and second component parts through the retention of one component in a bed of adsorption material while allowing the other components to flow therethrough. In order to provide for continuous operation, it is common practice to use two beds of adsorption material and sequentially adsorb one bed while desorbing the other bed. A first series of solenoid valves associated with the two beds allows the fluid mixture to freely flow to a first of the two beds where one component is retained and a product effluent allowed to flow to a storage container through a conduit. At the same time a portion of the product effluent enters a second of the two beds and purges the same of the one component previously retained therein. After a period of time, a signal from a timing mechanism deactivates the first series of solenoid valves and activates a second series of solenoid valves to reverse the communication of the fluid mixture from the first of the two beds to the second. The first bed of adsorption material previously producing the product effluent is now purged by a portion of the product effluent produced in the second bed.

Theoretically, the volume of fluid mixture passing through the first and second beds of adsorption material should be equal. However in practice it has been observed that the beds of adsorption materials are nearly always different. This difference can be the result of minute changes in size betwen the beds, variations in the density of the beds, and variations in the quality of the beds such as porosity and mositure content. In addition, a few seconds change in the operation of the solenoid by the timing mechanism can cause a degradation of the beds.

Thus, one of the two beds is always producing more of a product effluent than the other. The overproducing bed experiences a component breakthrough which dilutes the product effluent during its adsorption part of the operational cycle while the underproducing bed has an excessive amount of the component retained therein at the initiation of its adsorption cycle. The underproducing bed never reaches its output potential since the adsorption cycle is terminated before the product effluent output peaks.

One method of providing identical beds requires the testing of the adsorption capacity of the beds as they are produced and thereafter selecting matching beds of the same capacity for each unit. Unfortunately, this type of production does not lend itself for rapidmanufacturing production.

Another method of acquiring optimum output from an oxygen separator requires the use of an electrical timer whereby the operation of the solenoid valve can be varied to match the adsorption capacity of the beds. The cycle of adsorption of the underproducing bed is lengthened while the cycle of adsorption of the overproducing bed is shortened until both beds are operating at top efficiency. However, this solution is only temporary since after an extended period of time the beds become unbalanced in the opposite direction since the retained component is not completely purged from the one bed.

SUMMARY OF THE INVENTION

In evaluating the operation of oxygen separator apparatus, we discovered that the fluid pressure in the underproducing bed is always less than in the overproducing bed. We found that an operational balance between beds of adsorption material can be achieved by controlling the cycling through the use of a pressure control system.

The pressure control system includes a first series of valves responsive to a first pneumatic signal for allowing a fluid mixture to be presented to a first bed while purging any component of the fluid mixture retained in a second bed with a portion of first product effluent flowing from the first bed during a first mode of operation, and a second series of valves responsive to a second pneumatic signal for allowing the fluid mixture to be presented to the second bed while purging any component of the fluid mixture retained in the first bed with a portion of the second product effluent from the second bed during a second mode of operation. A first sensor is connected to the first bed for developing a first signal corresponding to the pressure level of the product effluent in the first bed and a second sensor is connected to the second bed for developing a second signal corresponding to the pressure level in the second bed. A logic sequencer responsive to the first and second signals supplies the first and second valves with corresponding first and second pneumatic signals for sequentially establishing the first and second modes of operation.

It is the object of this invention to provide a fulid separator with a pneumatically operated cycle control to optimize the production of a product effluent.

It is another object of this invention to provide an oxygen separator having first and second beds of adsorption material with a pneumatic control for transferring the communication of a supply fluid between the first and second beds as a function of the differential fluid pressure between these beds.

It is another object of this invention to provide a pneumatic control system for maintaining a balance in the oxygen separation capabilities of two molecular sieve beds independent of the dissimilarities in the beds by terminating the adsorption of each bed at a fixed pressure in the bed.

These and other objects should become apparent from reading this specification and viewing the drawings.

DETAILED DESCRIPTION

Figure 1:
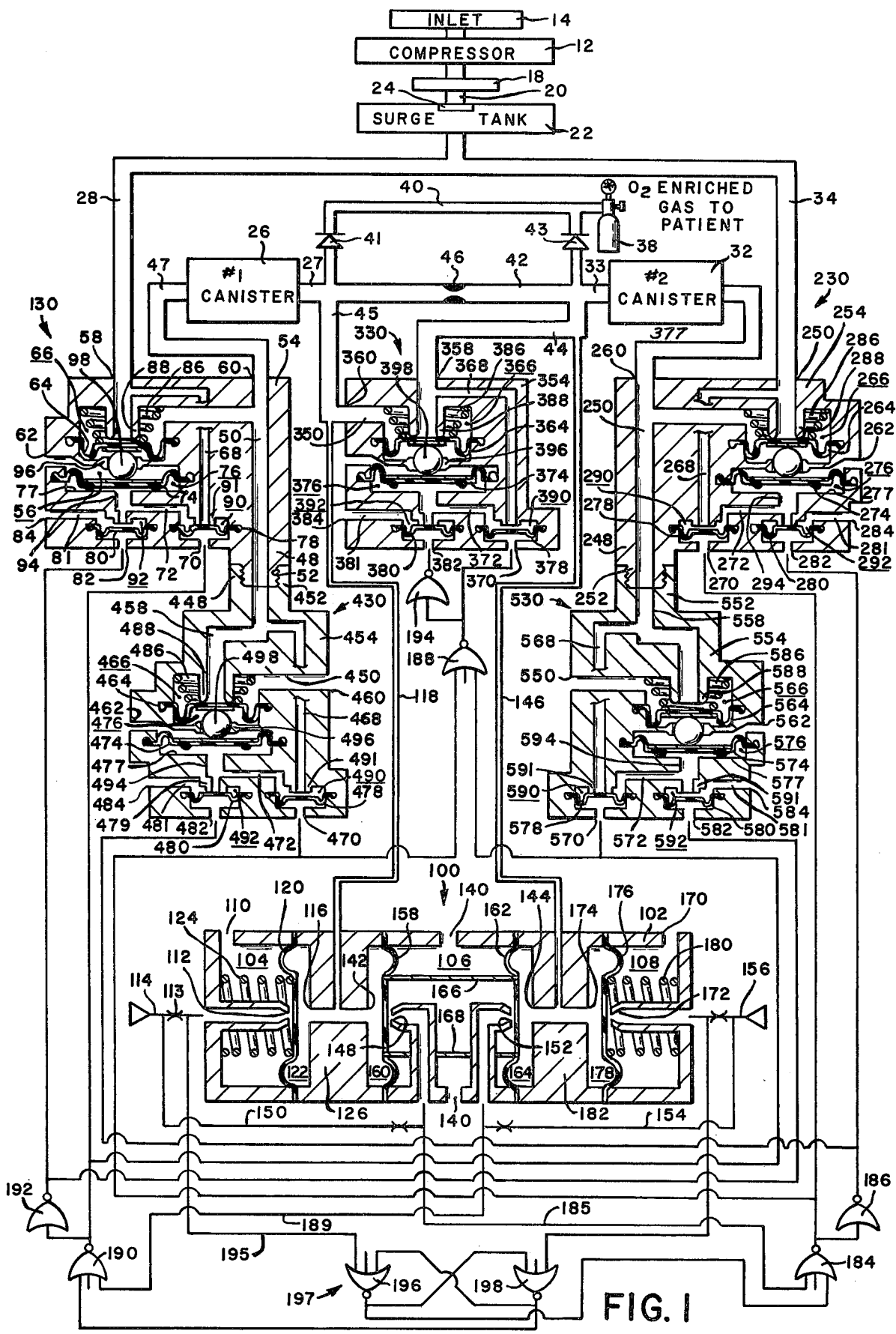
FIG. 1 is a diagrammatic illustration of a fluid separator system having cycle control made according to the principles of this invention.

The fluid separation system shown in FIG. 1 includes a compressor 12 through which air from the atmosphere is drawn through a first filter device means 14 wherein dust and other airborne particles and bacterial particles which may be harmful to the health of a recipient or patient, are removed. The compressor 12 is of the rotary vane type wherein the air is pressurized to between 10-15 psig. The vanes in this type compressor are usually made of carbon. Due to the speed that the vanes are rotated, some carbon dust may be present in the pressurized air and necessitates locating a second filter 18 at the exit of the compressor 12 adjacent supply conduit 20 in order to insure a clinically pure air supply. The supply conduit 20 connects the compressor 12 with a surge tank 22. A oneway check valve 24 located at the entrance of the surge tank 22 prevents back flow into the supply conduit 20 from the surge tank 22 during the switching mode of the fluid separation system.

The surge tank 22 is connected to a first bed of adsorption material retained in a first chamber 26 by a first supply conduit 28 which passes through a first supply valve 130 and to a second bed of adsorption material retained in a second chamber 32 by a second supply conduit 34 which passes through a second supply valve 230.

The first and second beds of adsorption material 26 and 32 are connected to storage container 38 through an outlet conduit 40 and to each other through conduit 42 and 44, respectively. A restriction 46 located in conduit 42 allows a portion of the output product effluent of the bed connected to the fluid mixture to continually flow into the other bed of adsorption material and purge any component retained therein to the atmosphere.

A third valve 330 located in conduit 44 allows the fluid pressure in the first and second beds of adsorption material to equalize during the shifting of the adsorption mode of operation between the first and second beds 26 and 32.

In addition, the first and second beds of adsorption material 26 and 32 are connected to the atmosphere through atmospheric control valves 430 and 530. Atmospheric control valve 430 is connected to the first bed of adsorption material 26 and is operated in conjunction with the second supply valve 230, hereinafter, these valves are referred to as a second series of valves. Similarly, atmospheric control valve 530 is operated in conjunction with the first supply valve 130, hereinafter, these valves are referred to as a first series of valves.

The structure and operation of valves 130, 230, 330, 430, and 530 are identical with the exception of plumbing changes required to operate the separating system. Therefore, only the structure in valve 130 is described in detail. Unless necessary for the understanding of the invention the elements identified in valve 130 are identified in the other valves by placing the appropriate 100 character with the identification number.

Valve 130 has a housing 54 with a chamber 56 located therein. An entrance or first port 58 connects chamber 56 to supply conduit 28. An exit or second port 60 connects chamber 56 to the first bed of adsorption material 26. A port 62 connects chamber 56 to the atmosphere. A diaphragm 64 separates the entrance and exit ports 58 and 60 from port 62 to establish a supply chamber 66. A passage 68 connects the entrance port 58 to a first control chamber 90. The first control chamber 90 has a port 70 through which a first operational control signal is communicated from a pneumatic logic sequencer 100. The first control chamber 90 is connected to chamber 56 by a second passage 72. A diaphragm 78 separates the port 70 from the control chamber 90 to prevent the first operational signal from being communicated to chamber 56. A driver diaphragm 74 separates chamber 56 from the atmosphere to establish a power chamber 76. The power chamber 76 is connected to a second control chamber 92 by a third passage 94. A diaphragm 80 separates the second control chamber 92 from a port 82 through which a second operational control signal is communicated from the pneumatic logic sequencer 100. A port 84 connects the second control chamber 92 to the atmosphere.

Chamber 56 has a wall 96 for retaining a linkage member 98 which joins the driver diaphragm 74 to diaphragm 64. A spring 86 which acts on diaphragm 64 urges driver diaphragm 74 toward wall 77 in chamber 76 to allow the fluid mixture in the supply conduit 28 to flow past seat 88 and into the supply chamber 66.

A projection 48 which surrounds passage 50 has threads 52 thereon. Threads 52 are matched with threads 452 on projection 448 extending from housing 454 of atmospheric valve 430. Chamber 466 in the atmospheric valve is connected to the atmosphere through passage 450. The first bed of adsorption material 26 is connected to the atmosphere through conduit 47, passage 50, inlet port 458, control chamber 466 and passage 450 during the second mode of operation.

The second valve 230 is connected to the second bed of adsorption material 32 and atmospheric valve 530 is connected to the second valve 230 in the same manner as the first valve 130 and atmospheric valve 430 are connected to each other and the first bed of adsorption material 26.

In the third valve 330, port 358 is connected to the second bed of adsorption material 32 and port 360 is connected to the first bed of adsorption material 26. In response to an equalization signal from the logic sequencer 100, valve 330 provide free communication between the first and second beds through the supply chamber 366.

The sequential operation of valves 130, 230, 330, 430 and 530 is completely controlled by operational signals generated and developed in the logic sequencer apparatus 100.

In more particular detail, the logic sequencer apparatus 100 includes a housing 102 with a first chamber 104, a second chamber 106 and a third chamber 108 located therein.

The first chamber 104 has a port 110 connected to the atmosphere, a port 112 connected to conduit 114 carrying a source of pressurized air, and a port 116 connected to conduit 118 extending from outlet conduit 45 of the first bed of adsorption material 26. A diaphragm 120 attached to housing 102 separates port 116 from the atmospheric port 110 and port 112 to establish a first pressure sensor chamber 122 in the first chamber 104. A spring 124 located in chamber 104 acts on and urges diaphragm 120 against the wall 126 which separates the first chamber 104 from the second chamber 106.

The second chamber 106 has a series of ports 140 connected to the atmosphere, a port 142 connected to conduit 118 going to the first bed of adsorption material 26, a port 144 connected to conduit 146 going to the second bed of adsorption material 32, a port 148 connected by conduit 150 to conduit 114 carrying a supply of pressurized air, and port 152 connected by conduit 154 to conduit 156 carrying a supply of pressurized air. A diaphragm 158 attached to the housing 102 separates port 142 from the series of ports 140 to establish a first product effluent pressure sensor chamber 160 and a diaphragm 162 attached to the housing 102 separates port 144 from the series of ports 140 to establish a second product effluent pressure sensor chamber 164. A series of struts 166 and 168 connect the diaphragm 158 to diaphragm 162, such that any movement in one of these diaphragms toward ports 148 and 152 moves the other away from these ports by the same amount.

The third chamber 108 has a port 170 connected to the atmosphere, a port 172 connected to conduit 156 carrying the source of air under pressure, and a port 174 connected to conduit 146 going to the second bed of adsorption material 32. A diaphragm 176 attached to housing 102 separates port 174 from the atmospheric port 170 to establish a second pressure sensor chamber 178 in the third chamber 108. A spring 180 located in chamber 108 acts on and urges diaphragm 176 toward shoulder 182 which separates the chamber 178 from chamber 164.

Conduit 150 connected to port 148 is also connected to a first NOR gate 184 by a conduit 185. NOR gate 184 in response to a first sensor signal generated in chamber 104 supplies NOR gate 186, port 270 in valve 230, port 482 in valve 430, and NOR gate 188 with an actuation signal in the first mode of operation. Similarily, conduit 154 connected to port 152 is also connected to a second NOR gate 190 by conduit 189. NOR gate 190 in response to a second sensor signal generated in chamber 108 supplies NOR gate 192, port 70 in valve 130, port 570 in valve 530 and NOR gate 188 with an actuation signal in the second mode of operation.

NOR gate 188 in turn supplies port 370 in valve 330 and NOR gate 194 with actuation signals during the first and second modes of operation to prevent fluid communication through the supply or control chamber 366 and during the transition in switching between the first and second modes with an appropriate signal to allow fluid to freely flow between ports 358 and 360.

A flip flop switch 197 consisting of NOR gates 196 and 198 is attached to conduit 114 and 156, respectively, and in response to the first and second sensor signals, provide NOR gates 184 and 190 with termination and actuation signals to establish the first and second modes of operation in the oxygen separator.

Figure 4:
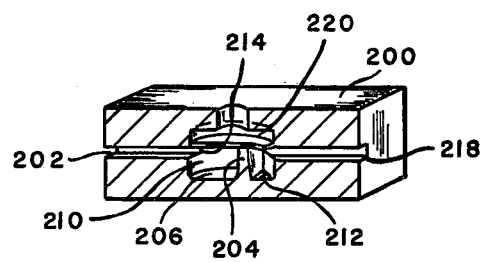
FIG. 4 is a sectional view of a typical NOR gate used in the logic sequensor of the fluid separator of FIG. 1.

The NOR gates in the logic sequencer 100 of which 186 and 192 are illustrated in FIG. 4, have a housing 200 with a chamber 206 located therein. A restriction or seat surface 204 separates chamber 206 into an inlet chamber 210 and an outlet chamber 212. A diaphragm 214 further separates the chamber into a control chamber 220 which extends over the wall or restriction 204 and is substantially equal in surface area to the sum of the inlet and outlet chambers 210 and 212. The control chamber 220 is connected to an actuation NOR gate and in response to an operation signal interrupts the flow of a source of fluid under pressure (usually air) from port 202 to the outlet port 218 by moving the diaphragm 214 against the seat or restriction 204. The control signal is substantially equal to the pressure of the fluid presented to the inlet port 202 and therefore, because of the larger area of the diaphragm in the control chamber 220, holds the diaphragm against the seat or restriction 204 in opposition to the force of the fluid acting on the surface of the diaphragm 214 in the inlet chamber 210.

When the pressure signal to the control chamber 220 is terminated, the fluid pressure in the inlet chamber 210 acts on and moves the diaphragm away from the seat or restriction to permit a pneumatic fluid pressure signal to pass through the NOR gate.

A further description of such NOR gate can be found in U.S. Pat. No. 3,318,329.

PREFERRED MODE OF OPERATION OF THE INVENTION

The fluid separation system shown in FIG. 1 is activated whenever a pressurized fluid mixture is presented to surge tank 22. As shown in FIG. 1, the pressurized fluid mixture (air) is derived from compressor 12; however, a bottled pressurized fluid mixture could be substituted therefor.

Figure 3:
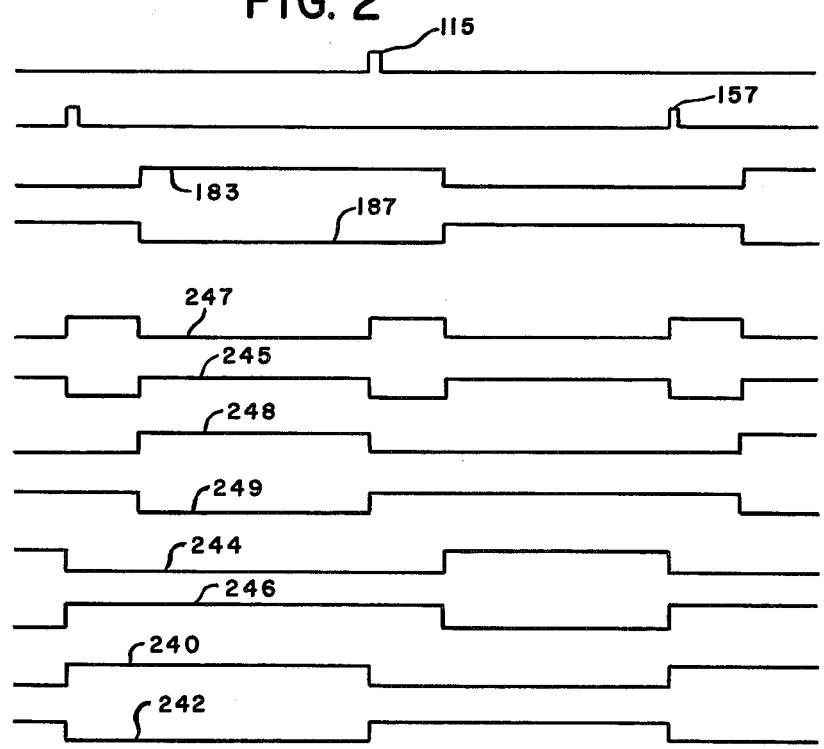
FIG. 3 is a graph illustrating the operation of first and second sensors associated with the logic sequensor in the cycle control.

Initially, the flip flop switch 197 is in either a first or second conduction state as illustrated by lines 240 for NOR gate 196 or line 242 for NOR gate 198 as shown in FIG. 3. If the flip flop switch 197 is in the state wherein the first mode of operation exists, a signal to NOR gate 184, as illustrated by line 244 in FIG. 3, prevents the communication of a control signal to the control chamber in NOR gate 186, as illustrated by line 246 in FIG. 3, this allows a fluid pressure signal from NOR gate 184 to be presented to port 282 in valve 230 to prevent fluid from flowing through passage 281 to the atmosphere while allowing the fluid mixture to flow through passages 34 and 268 past diapgragm 278 into passages 272 and 294 for presentation to chamber 276. The fluid mixture pressure acts in chamber 276 on the driver diaphragm 274 to move diaphragm 264 against seat 288 and prevent the flow of the fluid mixture through supply chamber 266 to the second bed of adsorption material 32.

At the same time, the fluid pressure signal from NOR gate 186 is presented to diaphragm 480 in atmosphere valve 430 to prevent communication of the fluid mixture under pressure in chamber 476 from flowing past seat 479 to the atmosphere through passage 481. The fluid mixture under pressure in passage 468 flows past seat 491 for communication through passages 472 to chamber 476 where the pressure acts on the driver diaphragm 474 to move diaphragm 464 into contact with seat 488 and prevent the flow of fluid through the supply chamber 466 to the atmosphere through passage 450. The pressure signal from NOR gate 186 is also presented to NOR gate 188 to interrupt any pressure signal therefrom. The pressure signal from NOR gate 188 follows a curve illustrated by line 247 in FIG. 3 to allow NOR gate 194 to present diaphragm 380 with a pressure signal which follows a curve illustrated by line 245 in FIG. 3. The pressure of the product effluent in conduit 44 acts on driver diaphragm 374 and moves diaphragm 364 against seat 388 to prevent communication between the first and second beds of adsorption material at this time.

In this first mode of operation, the pressure signal from NOR gate 190 follows a curve illustrated by line 248 in FIG. 3. Without a control signal in NOR gate 190, a fluid pressure signal flows therefrom which interrupts the flow of a pressure signal from NOR gate 192. The output pressure signal from NOR gate 192 follows a curve illustrated by line 249 in FIG. 3.

The pressure signal from NOR gate 190 is presented to diaphragm 80 in valve 130 to prevent the communication of the pressurized fluid mixture present in passage 65 from flowing past seal 91 to diaphragm 578 in valve 530 and to prevent communication of any product effluent present in passage 568 from flowing past seat 591.

The pressure signal from NOR gate 190 upon presentation to NOR gate 192 interrupts any pressure signal therefrom and allows spring 86 to move diapharagm 64 away from seat 88. With diaphragm 64 off seat 88, the fluid mixture is free to flow through supply chamber 66 into passage 50 for distribution through conduit 47 to the first bed of adsorption material 26.

Similarly, spring 586 acts on moves diaphragm 564 away from seat 588 to communicate the second bed of adsorption material 32 to the atmosphere. Chamber 576 is also connected to the atmosphere through passage 581 since diaphragm 580 is not urged against seat 591 by a pressure signal in the first mode of operation.

Thus, the fluid mixture freely flows from the supply conduit 28 to the first bed of adsorption material 26 where one component is retained therein and as a product effluent flows through conduit 27. The product effluent in conduit 27 flows past check valve 41 into conduit 40 for distribution to either a supply chamber 38 or directly to a patient. A portion of the product effluent flows past restriction 46 in conduit 42 to the second bed of adsorption material 32. This portion of the product effluent passes through the second bed 32 and desorbs any component retained therein by flowing in conduit 37 to passages 250 and 268 for communication to passage 558 in atmosphere valve 530. Since diaphragm 564 of valve 530 is away from seat 588, the product effluent port 550 and component freely flows through chamber 566 to the atmosphere through port 550.

The product effluent in conduit 27 is presented to the logic sequencer apparatus 100 through conduit 118. The fluid pressure in the product effluent is simultaneously presented to sensor chambers 122 and 160. However, spring 124 holds diaphragm 120 against wall 126 and therefore only diaphragm 158 initially responds to this pressure by moving against the nozzle end of port 148 to restrict the flow of fluid therefrom. The restricted flow of fluid through port 148 creates a first pressure signal illustrated by curve 183 in FIG. 3, which is presented to NOR gate 184 in conduit 185 to initiate the first mode of operation.

Figure 2:
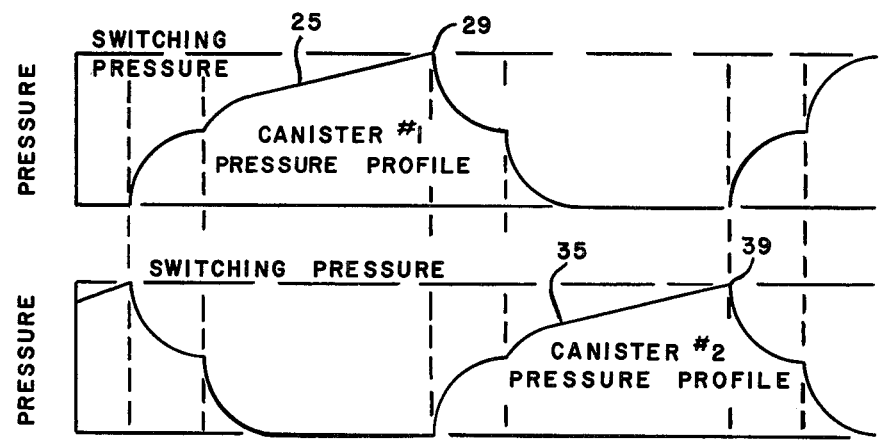
FIG. 2 is a graph showing the relationship of the fluid pressure in the first and second beds of adsorption material in a typical oxygen separator during a cycle of operation.

The fluid pressure in the first bed of adsorption material 26 continues to increase and follows a curve illustrated by line 25 in FIG. 2. When the fluid pressure reachs peak 29, the pressure of the product effluent communicated to sensor chamber 122 in the logic sequencer 100 is sufficient to overcome spring 124 and move diaghragm 120 against the nozle end of port 112. With flow of the fluid in conduit 114 downstream from restriction 113 terminated, a first pressure or sensor signal, illustrated by curve 115 in FIG. 3, is presented to NOR gate 196 of the flip flop switch 197 through conduit 195. The pressure or first sensor signal immediately changes the signal output from NOR gate 196 to interrupt the actuation signal to NOR gate 184.

At the same time NOR gate 198 supplies an actuation signal to NOR gate 190 which interrupts the pressure signal therefrom. Thereafter NOR gate 192 presents a pressure signal to diaphragm 80 which allows the fluid pressure in conduit 68 to flow past seat 91 and into chamber 76. The fluid pressure in chamber 76 acts on and moves diaphragm 64 against seat 88 by overcoming spring 86 to interrupt the flow of the pressurized fluid mixture through the supply chamber 66 to the first bed of adsorption material 26 to terminate the first mode of operation.

At the same time, the pressure signal from NOR gate 192 supplies diaphragm 580 with a pressure signal to seal seat 591 and allow the fluid pressure of the product effluent to flow to chamber 576. The fluid pressure acts on and moves diaphragm 564 against seat 588 by overcoming spring 586 to interrupt the flow through chamber 566 to the atmosphere.

The interruption of the pressure signal from NOR gate 190 removes the control pressure signal from NOR gate 188 and allows a pressure signal to issue therefrom. The pressure signal from NOR gate 188 acts on diaphragm 378 to interrupt communication between chamber 376 and passage 368. This pressure signal from NOR gate 188 also acts on NOR gate 194 to interrupt the pressure signal therefrom acting on diaphragm 380. Thus, spring 386 moves diaphragm 364 away from seat 388 and permits free communication between the first and second beds of adsorption material 26 and 32 to equalize the pressure therebetween.

The pressure in the first and second beds of adsorption material is compared in chambers 160 and 164 of the logic sequencer 100. As the pressure equalizes, diaphragm 158 moves away from nozzle end 148 to interrupt the actuation signal going to NOR gate 184. Thereafter NOR gate 184 produces a pressure signal which is communicated to the control chambers in NOR gates 186 and 188.

The pressure signal in the control chamber of NOR gate 188 terminates the pressure signal issuing therefrom and allows fluid communication from passages 368 to chamber 376.

At the same time, NOR gate 194 produces a pressure signal which acts on diaphragm 380 to interrupt communciation to the atmosphere through port 384. Thereafter, the fluid pressure in chamber 376 acts on and moves diaphragm 364 against seat 388 to terminate communication through chamber 366 between the first and second beds 26 and 32 of adsorption material.

The pressure signal from NOR gate 184 is also transmitted to diaphragm 278 to interrupt fluid communication from passage 268 to chamber 276. At the same time, this pressure signal is also communicated to the control chamber in NOR gate 186 to interrupt a fluid pressure signal emanating therefrom to diaphragm 280. This permits spring 286 to move diaphragm 264 away from seat 288 and allows the pressurized fluid mixture in conduit 34 to enter the supply chamber 266 for distribution to the second bed of adsorption material 32.

The product effluent from the second bed of adsorption material 32 is carried in conduit 33 past check valve 43 and into the outlet conduit 40 for distribution to either the storage container 38 or a patient.

A portion of the product effluent from the second bed of adsorption material 32 is communicated through restriction 46 to adsorb or purge any component retained in the first bed of adsorption material 26 by flowing to the atmosphere through conduit 47, passage 50, passage 458, chamber 466 and passage 450.

The pressure of the product effluent in conduit 33 builds up in a manner illustrated by curve 35 in FIG. 2, and is communicated through conduit 146 to chambers 164 and 178 in the iogic sequencer 100. This second product effluent pressure is communicated into chamber 164 and moves diaphragm 162 against nozzle end of port 152 to inititate a second actuation signal illustrated by curve 187 in FIG. 3. This second actuation signal is relayed through conduit 189 to NOR gate 190.

As the second mode of operation continues, the fluid pressure of the product effluent in conduit 33 increases until peak 39, as shown in FIG. 2, is reached. The peak fluid pressure is communicated into chamber 178 and acts on and moves diaphragm 176 against the nozzle end of port 172 to establish a second sensor signal 157.

The second sensor signal 157 is communicated to NOR gate 198 to terminate the second actuation signal to NOR gate 190 and allow NOR gate 196 to initiate an actuation signal to NOR gate 184 to start the transfer of communication of the pressurized fluid mixture from the second bed of adsorption material 32 to the first bed of adsorption material 26 in a manner as described above with respect to the tranfer form the first bed to the second bed.

The pneumatic logic sequencer 100 is adapted to respond to the same fluid pressure level in the first and second beds of adsorption material 26 and 32, irrespectively of the time involved in reaching the peak fluid pressure. The fluid pressure sensor signals developed in the logic sequencer 100 are controlled by the resistance of springs 124 and 180. By matching the springs 124 and 180, the peak fluid pressure 29 and 39 as illustrated in FIG. 2, are identical and thus the production of the product effluent from the beds of adsorption material 26 and 32 is optimized.

We claim:

1. In a breathing system wherein a breathable fluid is separated from a source of fluid mixture through retention of a component in the fluid mixture by an adsorption material located in first and second chambers, control means for regulating the communication of the source of fluid mixtures to the first and second chambers comprising:
   first valve means for allowing said source of fluid mixture to freely flow to the first chamber while communicating the second chamber to the atmosphere in a first portion of a mode of operation;
   second valve means for allowing said source of fluid mixture to freely flow to the second chamber while communicating the first chamber to the atmosphere in a second portion of the mode of operation;
   first sensor means connected to said first chamber for developing a first sensor signal corresponding to the fluid pressure in said first chamber;
   second sensor means connected to said second chamber for developing a second sensor signal corresponding to the fluid pressure in said second chamber; and
   logic sequencer means responsive to said first and second sensor signals for pneumatically operating the first and second valve means during the first and second portions of the mode of operation.

2. In the breathing system, as recited in claim 1, wherein said logic sequencer means includes:
   comparator means connected to said first and second chambers for generating an input signal representative of any fluid pressure differential between the first and second chambers.

3. In the breathing system, as recited in claim 2, wherein said logic sequencer means further includes:
   a first series of NOR gates connected to said comparator means and said first valve means;
   a second series of NOR gates connected to said comparator means and said second valve means; and
   a flip flop switch connected to said first and second sensor means and said first and second series of NOR gates, said flip flop switch responding to said first and second sensor signs to sequentially interrupt the communication of said input signal to said first and second series of NOR gates and thereby terminate the pneumatic operation of the first and second valve means.

4. In the breathing system, as recited in claim 3, further including:
   third valve means through which the first and second chambers are connected during the transition between the first and second portions of the mode of operation to equalize the pressure in the first and second chamber and interrupt the generation of an input signal by the comparator means.

5. In the breathing system as recited in claim 4, wherein said logic sequencer means further includes:
   a third series of NOR gates connected to said first and second series of NOR gates and responsive to a pneumatic input signal for allowing an equalization pneumatic output signal to operate said third valve means and prevent communication of fluid from the first and second chamber through said third valve means.

6. In the breathing system, as recited in claim 5, wherein said first valve means includes:
   a first housing having a first flow-through chamber therein with an entrance port connected to the source of fluid mixture, an exit port connected to said first chamber retaining the adsorption material, atmospheric port, and a control port connected to said first series of NOR gates, said entrance port being connected to said control port by a first passage and to the atmosphere by a second passage, said second passage being connected to said first flow-through chamber;
   first diaphragm means located in said first flow-through chamber for separating said entrance and exit ports from said atmospheric port;
   second diaphragm means located in said first flow-through chamber for separating said atmospheric port from said second passage; and
   third diaphragm means located between the control port and said first and second passages, said third diaphragm responding to the pneumatic input signal from the first series of NOR gates to prevent communication of the fluid mixture through said first passage while allowing the fluid mixture to freely flow from said entrance port to said exit port in said first portion of the mode of operation and allowing communication of the fluid mixture through said first and second passages to act on and move said second diaphragm, said second diaphragm in moving, urging said first diaphragm toward a seat to interrupt the flow of the fluid mixture through the exit port during said second portion of the mode of operation.

7. In the breathing system, as recited in claim 6, wherein said first valve means further includes:
   a second housing having a second flow-through chamber therein with an entrance port connected to said second chamber retaining the adsorption material, an exit port connected to the atmosphere, an atmospheric port, and a control port connected to said first series of NOR gates, said entrance port being connected to said control port by a first passage and to the atmosphere by a second passage, said second passage being connected to said second flow-through chamber;
   first diaphragm means in the second flow-through chamber for separating said entrance and exit ports therein from said atmospheric port;

second diaphragm means in the second flow-through chamber for separating said atmospheric port therein from said second passage; and third diaphragm means located in the second flow-through chamber between the control port and said first and second passages, said third diaphragm responding to the pneumatic input from the first series of NOR gates to prevent communication of fluid through said first passage and allow breathable fluid to purge said second chamber retaining the adsorption material of said one component by flowing from the entrance port to the exit port in said first portion of the mode of operation and allowing communication of the fluid mixture through said first and second passages to act on and move said second diaphragm, said second diaphragm in moving, urging said first diaphragm toward a seat to interrupt the flow of the fluid mixture through said exit port during said second portion of the mode of operation.

8. In the breathing system, as recited in claim 7, wherein said second valve means includes:

a third housing having a third flow-through chamber therein with an entrance port connected to the source of fluid mixture, an exit port connected to said second chamber retaining the adsorption material, an atmospheric port, and a control port connected to said series of NOR gates, said entrance port being connected to said control port by a first passage and to the atmosphere by a second passage, said second passage being connected to said third flow-through chamber;

first diaphragm means located in said third flow-through chamber for separating said entrance and exit ports therein from said atmospheric port;

second diaphragm means located in said third flow-through chamber for separating said atmospheric port therein from said second passage; and third diaphragm means located in the third flow-through chamber between said control port and said first and second passages, said third diaphragm responding to a pneumatic input signal from the second series of NOR gates to allow communication of said fluid mixture through said first and second passages to act on and move said second diaphragms, said diaphragm in moving, urging said first diaphragm toward a seat to prevent communication from the source of fluid mixture to said second chamber, retaining the adsorption material during said first portion of the mode of operation and allowing communication of fluid from the second chamber retaining the adsorption material during said second portion of the mode of operation.

9. In the breathing system, as recited in claim 8 wherein said second valve means further includes:

a fourth housing having a fourth flow-through chamber therein with an entrance port connected to said first chamber retaining the adsorption material, an exit port connected to the atmosphere, an atmospheric port, and a control port connected to said second series of NOR gates, said entrance port being connected to said control port by a first passage and to the atmosphere by a second passage, said second passage being connected to said fourth flow-through chamber;

first diaphragm means located in the fourth flow-through chamber for separating said entrance and exit ports from said atmospheric port;

second diaphragm means located in the fourth flow-through chamber for separating said atmospheric port from said second passage; and third diaphragm means located in the fourth flow-through chamber between said control port and said first and second passages, said third diaphragm responding to a pneumatic input signal from said second NOR gates to allow communication of said fluid mixture through said first and second passages to act on and move said second diaphragm, said second diaphragm in moving, urging said first diaphragm toward a seat to prevent communication from the entrance port to the exit port during said first portion of the mode operation and allowing communication therebetween by venting said second passage and the fourth flow-through chamber to atmosphere during said portion of the mode of operation.

10. In the breathing system, as recited in claim 9 wherein said control means further includes:

third valve means responsive to pneumatic input signals from said first and second series of NOR gates for providing communication between the first and second chambers retaining the adsorption material during the operational transfer between the first and second portions of the mode to permit the fluid pressures therein to equalize.

11. In a system having first and second beds of adsorption material for separating a component from a pressurized source of fluid mixture to produce effluent, control means for shifting the communication of pressurized source of fluid mixture between the first and second beds of adsorption material comprising:

first valve means for allowing said pressurizing source of fluid mixture to freely flow to said first bed to produce the product effluent while allowing a portion of the product effluent to purge said component from said second bed in a first portion of a mode of operation;

second valve means for allowing said pressurized source of fluid mixture to freely flow to said second bed to produce the product effluent while allowing a portion of the product effluent to purge said component from the first bed in a second portion of the mode of operation;

first sensor means connected to said first bed for developing a first sensor signal corresponding to the fluid pressure of the product effluent located therein;

second sensor means connected to said second bed for developing a second sensor signal corresponding to the fluid pressure of the product effluent located therein; and logic sequencer means responsive to said first and second sensor signals for supplying said first and second valve means with an operational pneumatic input signal to establish said first and second portions of the mode of operation.

12. In the system recited in claim 11 wherein said control means further includes:

comparator means for producing a third sensor signal in response to any pressure differential between the product effluent in the first and second beds of adsorption material.

13. In the system, as recited in claim 12, wherein said logic sequencer means includes:
- a first series of NOR gates connected to said first valve means;
- a second series of NOR gates connected to said second valve means: and
- a flip flop connected to said first and second sensors and said first and second series of NOR gates, said third sensor signals activating the first series of NOR gates to initiate said first portion of the mode of operation, said flip flop responding to said first sensor signal to switch the third sensor signal to said second series of NOR gates thereby terminating said first portion of the mode of operation and initiating said second portion of the mode operation, said flip flop responding to said second sensor signal to switch the third sensor signal to the first series of NOR gates to complete a cycle of operation in the system.

14. In the system recited in claim 13 wherein said control means further includes:
- third valve means responsive to the activation of said first and second series of NOR gates for providing a communication path between said first and second beds of adsorption materials during the switching of said operational modes by said flip flop.

* * * * *